(12) United States Patent
Sangameswaran et al.

(10) Patent No.: US 9,623,858 B2
(45) Date of Patent: Apr. 18, 2017

(54) FUEL MAINTENANCE MONITOR FOR A PLUG-IN HYBRID VEHICLE

(71) Applicant: Ford Global Technologies, LLC, Dearborn, MI (US)

(72) Inventors: Sangeetha Sangameswaran, Troy, MI (US); William David Treharne, Ypsilanti, MI (US); Robert David Hancasky, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 783 days.

(21) Appl. No.: 13/655,506

(22) Filed: Oct. 19, 2012

(65) Prior Publication Data

US 2014/0114511 A1 Apr. 24, 2014

(51) Int. Cl.
| | |
|---|---|
| *B60W 10/06* | (2006.01) |
| *B60W 10/28* | (2006.01) |
| *B60W 10/08* | (2006.01) |
| *B60W 50/08* | (2012.01) |
| *B60W 20/00* | (2016.01) |
| *F02D 28/00* | (2006.01) |

(Continued)

(52) U.S. Cl.
CPC ............ *B60W 10/06* (2013.01); *B60W 10/08* (2013.01); *B60W 10/26* (2013.01); *B60W 20/18* (2016.01); *B60W 50/087* (2013.01); *B60W 2510/0623* (2013.01); *Y02T 10/6269* (2013.01); *Y02T 10/6286* (2013.01); *Y02T 90/14* (2013.01)

(58) Field of Classification Search
CPC ...... B60W 20/00; B60W 10/06; B60W 10/08; B60W 50/087; B60W 20/18; B60W 10/26; B60W 2510/0623; Y02T 10/6286; Y02T 90/14; Y02T 10/6269

USPC .................... 701/22, 104, 102, 105; 903/930
See application file for complete search history.

(56) References Cited

U.S. PATENT DOCUMENTS

| | | |
|---|---|---|
| 7,980,342 B2 | 7/2011 | Andri |
| 8,090,520 B2 | 1/2012 | Tate, Jr. et al. |

(Continued)

FOREIGN PATENT DOCUMENTS

JP  WO2012014845  *  2/2012

OTHER PUBLICATIONS

Chinese Office Action and English Translation for Application No. 201310495431.5, dated Nov. 9, 2016, 14 pages.

*Primary Examiner* — Nga X Nguyen
(74) *Attorney, Agent, or Firm* — Brooks Kushman P.C.; David B. Kelley (57) ABSTRACT

A vehicle has an engine, a fuel tank, and a controller configured to selectively operate the engine, during one or more drive cycles, until a specified fraction of fuel from the tank has been consumed in response to expiration of a predefined time period to limit fuel degradation. A powertrain system has a traction battery, an engine, a fuel tank, and a controller configured to selectively operate the engine in response to a quality of fuel in the tank being below a threshold until a specified fraction of fuel has been consumed, thereby limiting fuel degradation. A method of controlling a vehicle includes, in response to expiration of a predefined time period, selectively operating an engine, during one or more vehicle drive cycles, such that state of charge of a traction battery is generally maintained until a specified fraction of fuel in a fuel tank has been consumed to limit degradation of the fuel.

13 Claims, 6 Drawing Sheets

(51) Int. Cl.
*B60W 10/26* (2006.01)
*B60W 20/18* (2016.01)

(56) References Cited

U.S. PATENT DOCUMENTS

| | | |
|---|---|---|
| 8,177,006 B2 | 5/2012 | Leone |
| 8,818,692 B2 * | 8/2014 | Iraha ..................... B60K 6/365 180/65.28 |
| 2010/0186702 A1 | 7/2010 | Yaccarino |
| 2010/0256931 A1 | 10/2010 | Proefke et al. |
| 2011/0066352 A1 | 3/2011 | Blanchard et al. |
| 2012/0035795 A1 * | 2/2012 | Yu et al. ......................... 701/22 |
| 2013/0030635 A1 * | 1/2013 | Morita .................. B60K 6/445 701/22 |
| 2013/0173106 A1 * | 7/2013 | Konishi ......................... 701/22 |

* cited by examiner

FUEL MAINTENANCE MONITOR FOR A PLUG-IN HYBRID VEHICLE

TECHNICAL FIELD

Various embodiments relate to a fuel maintenance monitor for a plug-in hybrid vehicle and a method of using the monitor.

BACKGROUND

A plug-in hybrid electric vehicle (PHEV) has more than one source of power. An electric machine may be configured to propel the vehicle and uses a battery as a source of energy. The battery may be recharged using an external power source, such as a charging station. An engine may also be configured to propel the vehicle and use fuel as a source of energy.

The PHEV may operate for long periods of time using only battery power, for example, when the PHEV is used for shorter commutes, trips, and the like. The battery is recharged between these trips using a charging station and does not reach a state of charge where engine power is required to propel the vehicle. Fuel in the fuel tank may degrade or become stale during these periods of time of the vehicle operating using primarily battery power. In some instances, this may lead to fuel degradation such as acid formation in the fuel, waxing with olefin formation, and the like.

SUMMARY

In an embodiment, a vehicle has an engine, a fuel tank configured to supply fuel to the engine, and a controller. The controller is configured to selectively operate the engine, during one or more drive cycles, until a specified fraction of fuel from the tank has been consumed in response to expiration of a predefined time period to limit degradation of the fuel.

In another embodiment, a powertrain system for a vehicle has a traction battery, an engine, a fuel tank configured to supply fuel to the engine, and a controller. The controller is configured to selectively operate the engine, during one or more drive cycles, in response to a quality of fuel in the tank being below a threshold quality until a specified fraction of fuel from the tank has been consumed to limit degradation of the fuel.

In yet another embodiment, a method of controlling a hybrid vehicle is provided. In response to expiration of a predefined time period, an engine is selectively operated, during one or more vehicle drive cycles, such that state of charge of a traction battery is generally maintained until a specified fraction of fuel in a fuel tank has been consumed to limit degradation of the fuel.

As such, various embodiments according to the present disclosure provide associated non-limiting advantages. For example, the PHEV uses fuel in a timely manner before the fuel can degrade due to age. A fuel maintenance monitor causes the engine to operate to use fuel when it may not otherwise operate. A specified fraction of fuel is set to be used after expiration of a specified time period or when a quality value for the fuel is below a threshold value. The specified time period or the quality can be modified, for example, by a refueling event. The user is informed to maintain user expectations for the vehicle operation. The vehicle may be operated in one of several modes when the fuel maintenance monitor is triggered. For example, the vehicle may operate in a charge sustaining mode, or HEV mode, which provides for operation of the engine and/or the electric machine, and provides improved fuel economy over engine only operation of the vehicle. The vehicle may also be operated in a modified hybrid mode with charging features of the traction battery disabled, thereby causing increased engine use and fuel consumption.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Plug-in hybrid electric vehicles (PHEV) utilize a larger capacity battery pack than a standard hybrid electric vehicle (HEV). PHEVs have the capability to recharge the battery from a standard electrical outlet or charging station connected to the external electric grid to reduce fuel consumption and to improve the vehicle's fuel economy. The PHEV structure is used in the figures and to describe the various embodiments below; however, it is contemplated that the various embodiments may be used with vehicles having other vehicle architectures as are known in the art. The engine may be a compression or spark ignition internal combustion engine, or an external combustion engine, and the use of various fuels is contemplated. In one example, the vehicle has the ability to connect to an external electric grid, such as in a plug-in electric hybrid vehicle (PHEV).

Besides the gasoline fuel energy, a PHEV also has an additional energy source of electrical energy stored in the battery, which may be electric energy from the electric grid deposited in the vehicle's battery during charging. The power management of the PHEV allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it may be desirable for PHEVs to use as much pre-saved battery electric (grid) energy as possible before the next charge event (when the vehicle is "plugged-in"). To increase fuel economy, the relatively inexpensive, grid-supplied electric energy may be preferentially used to save as much gasoline fuel as possible.

Figure 1:
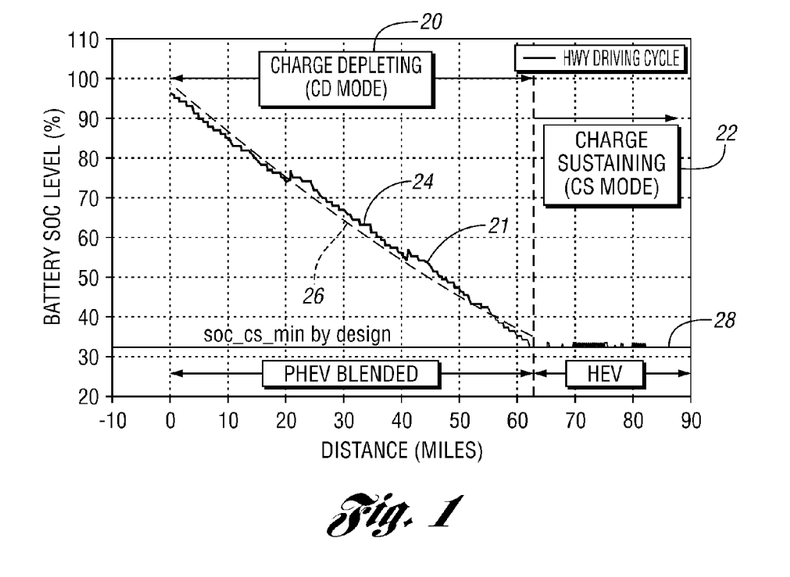
FIG. 1 is a chart illustrating two modes of operation for a plug-in electric vehicle according to an embodiment.

Generally, a PHEV has two basic operating modes as seen in FIG. 1. In a Charge Depleting (CD) mode 20 the battery electric energy 21 is primarily used to propel the vehicle. The fuel assists the vehicle drive power supply only in certain driving conditions or at excessive drive power requests during the basic charge depleting mode. One characteristic in the CD mode 20 is that the electric motor consumes more energy from the battery 21 than can be regenerated. In a Charge Sustaining (CS) mode 22 (or HEV mode), the vehicle reduces the electric motor propulsion usage to be able to keep the battery's State of Charge (SOC) 21 at a constant or approximately constant level by increasing the engine propulsion usage.

The PHEV may operate in an Electric Vehicle (EV) mode where the electric motor is used as much as possible (with or without help from the gasoline engine depending on PHEV strategy) for vehicle propulsion, depleting the battery up to its maximal allowable discharging rate under certain driving patterns/cycles. The EV mode is an example of a CD mode of operation for a PHEV. During an EV mode, the battery charge may increase, for example due to regenerative braking. The engine is generally not permitted to operate under a default EV mode, but may need to be operated based on a vehicle system state or as permitted by the operator through an override or hybrid operation selection. In other embodiments, the PHEV may operate in a forced EV mode, where the engine is not permitted to operate under normal vehicle conditions.

For the vehicle operation as shown in FIG. 1, once the battery SOC 21 decreases to a predefined charge sustaining level 28, the vehicle switches to CS mode 22, where the battery SOC 21 is kept within a vicinity of the charge sustaining SOC level, and the vehicle is primarily powered by the engine (fuel energy). The vehicle may also operate with the CD and CS modes in any order, or with CD and CS modes occurring multiple times during a key cycle. Also, the CD mode may have various battery discharging rates, or slopes. For example, the vehicle may be operated in CS mode at a battery SOC above level 28, either based on a user selection, vehicle management, or the like, and then be operated in a CD mode to use additional battery power.

In order to extend PHEV operational flexibility, the user may have the ability to select a preferred PHEV operation mode actively between electric and hybrid operation (EV/HEV). This permits a user to control the vehicle emissions, noise, and the like along the trip, and control the source of the power used by the vehicle, i.e. gasoline vs electricity. For example, the user may start by requesting an HEV driving mode 28 (battery charge sustaining at a high SOC off-charge) in the initial section of the trip. This saves the battery electric energy 21 such that the user can later switch to an EV driving mode 24 at another location where EV operation of the vehicle is desirable.

When the user selects a preferred PHEV operation mode using an interface in the vehicle, such as EV/HEV buttons, the user's inputs may disrupt the normal vehicle energy management strategy. The user has the freedom to actively manage the energy usage for his/her vehicle. The more a user uses the vehicle, the better he/she can understand the vehicle energy usage property, which will lead to familiarity and better optimization that the user can exercise with the battery energy usage tool. The manual energy planning feature will not only enable the user to simply select EV/HEV driving mode, but allows the user to actively plan the battery electric energy usage and fuel usage for the trip.

The vehicle may also have a modified HEV mode of operation with some charging features for the traction battery disabled. These features may include regenerative braking to charge the battery, charging the battery using engine power, and other ways of providing power to charge the battery while the vehicle is operating. In this mode, the electric machine may operate as a motor to provide additional power to meet vehicle demand and needs. The battery is being generally depleted such that its overall SOC decreases. In the modified HEV mode, the engine operates more frequently than for a regular HEV mode, leading to a higher percentage of engine-on time compared to the HEV mode. In the modified HEV mode, fuel may be more aggressively used or used at a faster rate than when the vehicle operates in a charge sustaining (HEV) mode.

Figure 2:
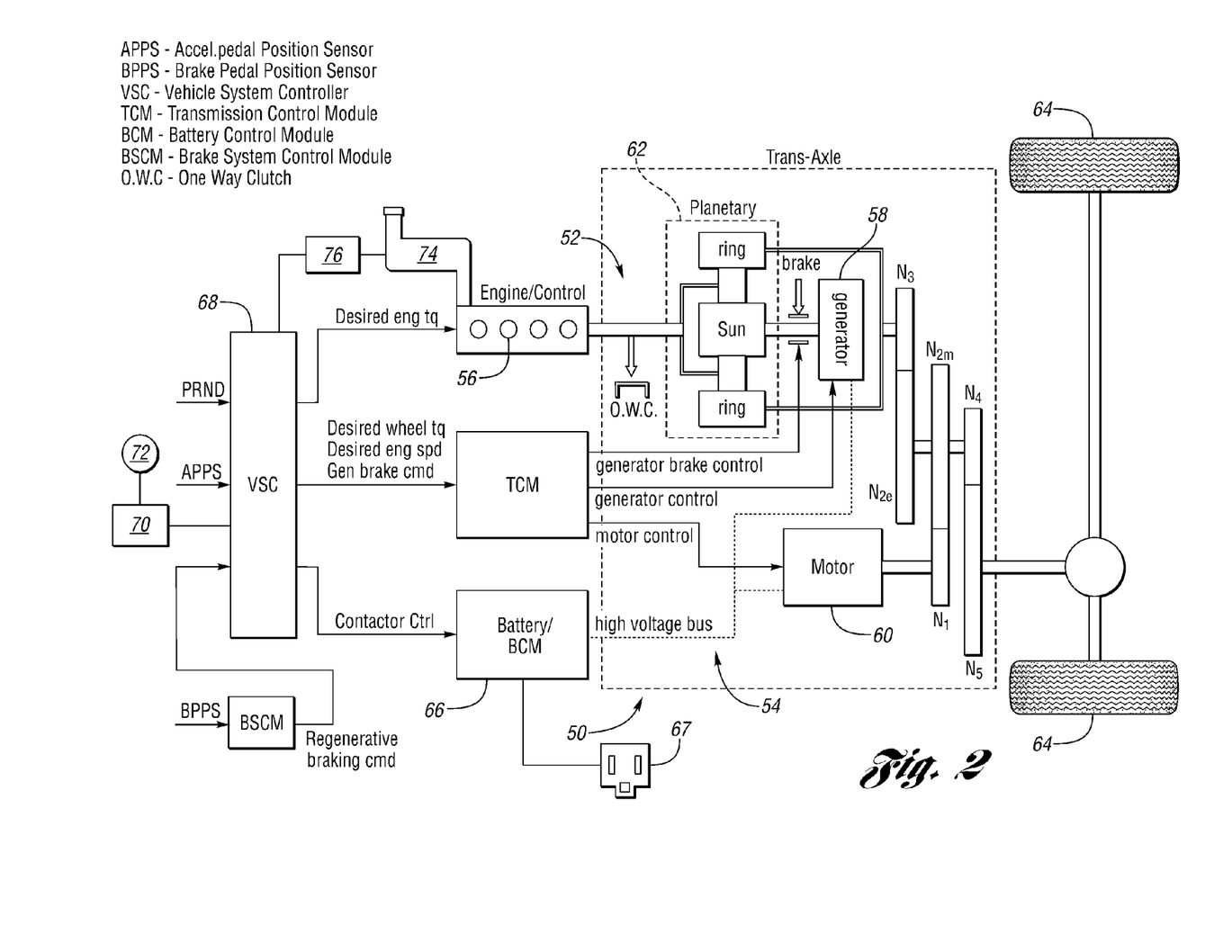
FIG. 2 is a schematic of a hybrid vehicle capable of implementing various embodiments of the present disclosure.

One example of a power split PHEV capable of implementing the present disclosure is shown in FIG. 2. FIG. 2 illustrates a power split hybrid electric vehicle 50 powertrain configuration and control system, which is a parallel hybrid electric vehicle. In this powertrain configuration, there are two power sources 52, 54 that are connected to the driveline. The first power source 52 is a combination of engine and generator subsystems using a planetary gear set to connect to each other. The second power source 54 is an electric drive system (motor, generator, and battery subsystems). The battery subsystem is an energy storage system for the generator and the motor and includes a traction battery.

During operation of the vehicle using the second power source 54, the electric motor 60 draws power from the battery 66 and provides propulsion independently from the engine 56 to the vehicle 50 for forward and reverse motions. This operating mode is called "electric drive". In addition, the generator 58 can draw power from the battery 66 and drive against a one-way clutch coupling on the engine output shaft to propel the vehicle forward. The generator 58 can propel the vehicle forward alone when necessary.

The operation of this power split powertrain system, unlike conventional powertrain systems integrates the two power sources 52, 54 to work together seamlessly to meet the user's demand without exceeding the system's limits (such as battery limits) while optimizing the total powertrain system efficiency and performance. Coordination control between the two power sources is needed.

As shown in FIG. 2, there is a hierarchical vehicle system controller (VSC) 68 that performs the coordination control in this power split powertrain system. Under normal powertrain conditions (no subsystems/components faulted), the VSC 68 interprets the user's demands (e.g. PRND and acceleration or deceleration demand), and then determines the wheel torque command based on the user demand and powertrain limits. In addition, the VSC 68 determines when and how much torque each power source needs to provide in order to meet the user's torque demand and achieve the operating point (torque and speed) of the engine.

The VSC 68 (which includes an electronic control unit (ECU) is connected to or integrated with a human-machine interface 70, or user interface. The user interface 70 can include a touch screen and/or a series of tactile buttons along with a screen and/or gauges for displaying information to the user.

The control system for the vehicle 50 may include any number of controllers, and may be integrated into a single controller, or have various modules. Some or all of the controllers may be connected by a controller area network (CAN) or other system.

The engine 56 is fueled by gasoline or another fuel contained in a fuel tank 74 in fluid communication with the fuel injectors or another fuel delivery system for the engine 56. The fuel tank 74 may be refueled by a user. The fuel tank may be instrumented with a fuel sensor 76, which is configured to measure the fuel level, fuel flow to the engine, a refueling event, other fuel parameters as are known in the art. The fuel sensor 76 is in communication with the VSC 68 to provide the fuel related data or measurements to the VSC 68.

The battery 66 may be recharged or partially recharged using a charging adapter 67 connected to a charging station powered by an external power source, such as the electrical grid, a solar panel, and the like. In one embodiment, the charging adapter 67 contains an inverter and/or a transformer on-board the vehicle.

The VSC 68 may receive signals or inputs from various sources to control the vehicle. These inputs include a user selected vehicle mode and a vehicle state such as battery state, fuel level, engine temperature, oil temperature, tire pressure, and the like. Route and map information may also be provided to the VSC 68 from a navigation system, which may be incorporated into the user interface 70.

An EV button 72, or other user input, provides for user selection of PHEV operation using electrical energy from the battery in an EV mode resulting in a user selected EV mode. In the user selected EV mode, the PHEV operates in charge depletion (CD) mode and the engine 56 may be disabled. The engine may be pulled up by the VSC beyond predetermined vehicle power or speed thresholds. The EV button 72 may be incorporated into the VSC 68 and the human machine interface 70 to allow the user to manually select an operation mode of EV or HEV for the vehicle. The button 72 allows the user to pre-determine the vehicle operation mode among EV, HEV, and automatic (VSC 68 selected) modes for a charge cycle or a key cycle.

Figure 3:
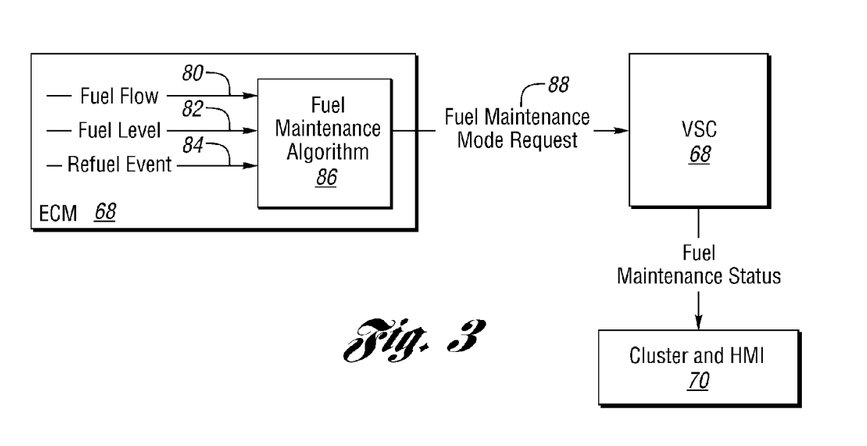
FIG. 3 is a flowchart illustrating an overview of a fuel maintenance monitor for a vehicle according to an embodiment.

FIG. 3 illustrates an overview of the system architecture and inputs for a fuel maintenance algorithm to maintain fuel freshness and prevent or reduce fuel degradation. The ECM 68 receives various input signals from sensors on-board the vehicle. For example, the ECM 68 may receive information regarding the fuel flow rate 80, the fuel level 82 in the fuel tank, and a refueling event 84 from sensor module 76. These inputs are used with a fuel maintenance algorithm 86 in the ECM 68. Based on the information from the sensors, in addition to a timer or other vehicle state inputs, the algorithm 86 determines whether set a fuel maintenance mode flag, and makes a fuel maintenance mode request at 88. The request 88 is communicated to the VSC 68, that controls the vehicle operation based on receiving the flag or request 88. The VSC 68 controls the various powertrain components to meet the request 88. The VSC 68 is also configured to communicate the request to the HMI 70, for example, to display to the user that a fuel maintenance mode has been entered.

Figure 4:
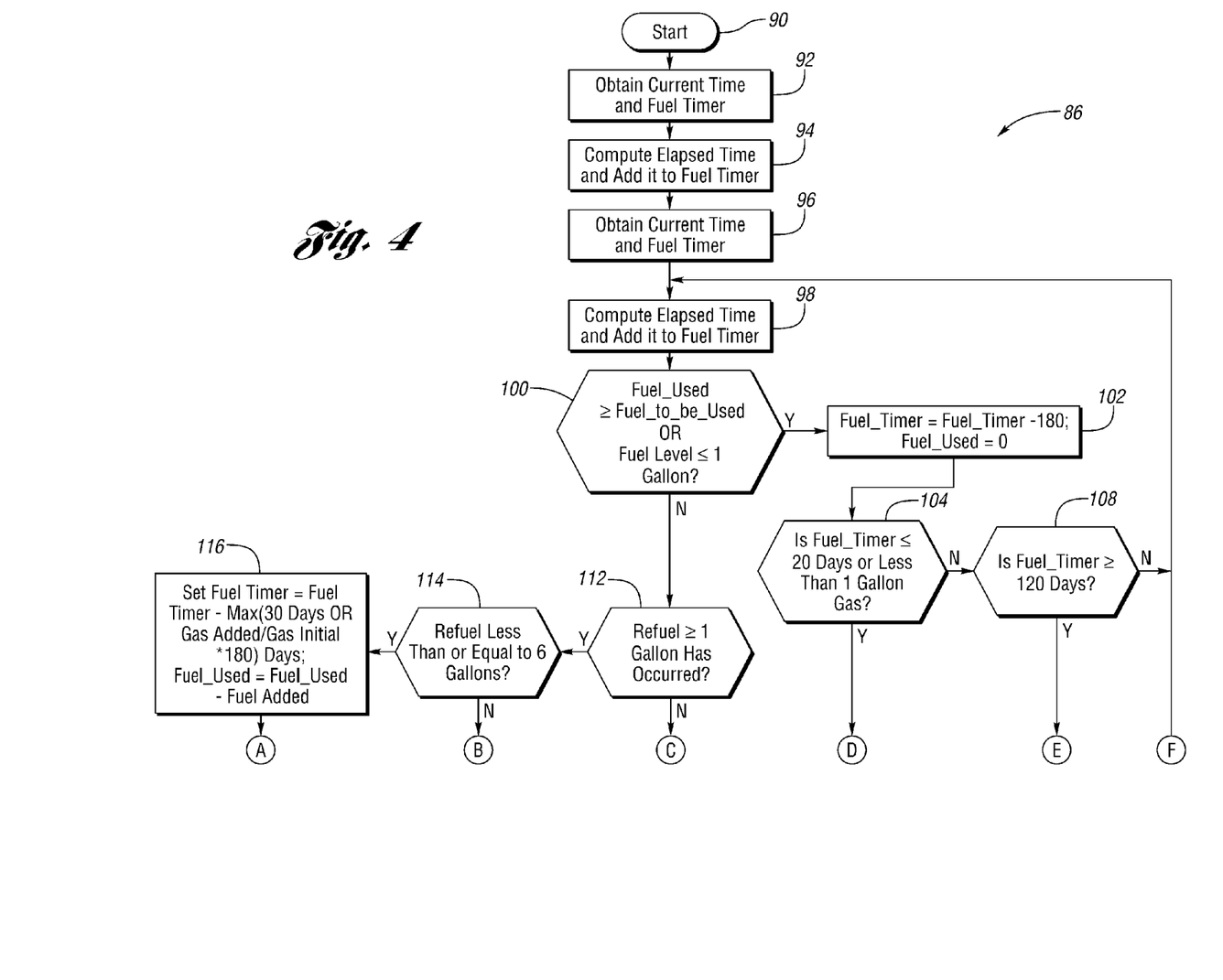
FIG. 4 is a flowchart illustrating a fuel maintenance monitor according to an embodiment.

An embodiment of a fuel maintenance algorithm 86 is illustrated in FIG. 4. The algorithm 86 uses various fuel levels and periods of time as threshold values. Examples of time periods and fuel levels or amounts are given below, and are intended to be non-limiting. The fuel maintenance algorithm 86 begins at 90. The algorithm 86 then references a current time and a fuel timer at 92. The current time is the real time for the vehicle, i.e. Greenwich Mean Time, or another time zone based time. The fuel timer is a counter that begins at a zero time value and is incremented by elapsed real time, i.e. the current time minus the previous time that the fuel timer was incremented. The fuel timer is incremented with elapsed time as obtained from the current time at 94.

The algorithm 86 checks the current time and the fuel timer at 96 and adds any elapsed time at 98. The algorithm 86 then references a fuel counter for the current fuel maintenance cycle at 100. A specified amount of fuel to be used (fuel_to_be_used) for a particular fuel maintenance cycle exists in the algorithm 86, as is explained further below. If the fuel that the vehicle has used (fuel_used) is greater than the fuel_to_be_used, the algorithm 86 proceeds to 102, where it generally exits an existing fuel maintenance mode of operation. Alternatively, if the fuel level in the fuel tank is less than a specified amount, such as a gallon or another low fuel level, the algorithm 86 also proceeds to 102 to exit a fuel maintenance mode of operation.

At 102, the fuel timer may be reset to zero. In another embodiment, the fuel timer may be reset or modified by subtracting a specified amount of time to reduce the time that the fuel timer is counting without resetting the fuel timer to zero. For example, block 102 deals with a case where the vehicle has consumed an amount of fuel over a long time period in an HEV mode by only subtracting a certain amount of time from the fuel timer and not resetting the timer to zero. In one embodiment, the fuel timer is reduced by 180 days at 102, or another similar amount. The fuel_used may also be reset to zero. In other embodiments, the fuel timer may be incremented such that the timer is extended. For example, this occurs when the vehicle consumes fuel during normal vehicle operation before entering the fuel maintenance mode.

At 104, the algorithm 86 determines if the fuel timer is less than another specified amount of time, such as 20 days, or if the fuel level is less than a specified amount, such as one gallon. Credit can be given for up to the specified amount of time (i.e., 20 days) of operating in a fuel maintenance mode.

If the fuel timer is less than the specified time or if the fuel level is less than the specified amount at 104, the fuel timer is reset to zero at 106. If the fuel timer is greater than the specified time or the fuel level is greater than the specified level at 104, the algorithm 86 determines at 108 if the fuel timer is greater than another specified time, such as 120 days. If the fuel timer is not greater than the specified time (120 days) at 108, the algorithm returns to 98. If the fuel timer is greater than the specified time (120 days) at 108, the fuel timer is reset to a specified time value, such as 120 days at 110, and the algorithm then returns to 98. This avoids going into a maintenance mode immediately after completing a previous maintenance mode, thereby spacing vehicle operation in maintenance mode apart in time.

Referring back to 100, if the fuel_used by the vehicle is less than the fuel_to_be used, or the fuel level is greater than a specified amount, i.e. one gallon, the algorithm 86 proceeds to 112. At 112 the algorithm 86 determines if more than a specified amount of fuel, i.e. one gallon, has been refueled into the fuel tank.

If more than the specified amount (one gallon) has been refueled at 112, the algorithm 86 proceeds to 114 to determine if the refueling was more or less than another specified amount, i.e. more or less than six gallons. If the refueling event was less than the specified amount (six gallons) at 114, the fuel timer is decremented at 116. The fuel timer may be decremented a set time period or by a scaled time period based on the amount of fuel that was added to the tank. The fuel timer may be decremented by the larger of these two values. In an embodiment, the set time period is thirty days, and the scaled time period is 180 days times the added amount of fuel divided by the fuel that was already in the fuel tank. Of course, other values or calculations may be used to decrement the fuel timer based on fuel added to the fuel tank. The algorithm 86 then calculates the fuel_to_be_used at 118 as a fraction of the fuel present in the fuel tank, such as one half of the amount of fuel in the fuel tank. In other embodiments, other fractions may be used to calculate a value for the fuel_to_be_used.

Referring back to 114, if the refueling event was greater than the specified amount (six gallons), the fuel timer is decremented at 120 by a specified amount, such as 180 days. The value for fuel_used is also reset to zero at 120. The algorithm 86 then goes to 118 to calculate the fuel_to_be_used as discussed previously.

The algorithm 86 then proceeds to 122 from either block 118 or 112. At 122, the fuel timer is compared to a time period, such as six months or 180 days. If the fuel timer is less than six months at 122, the algorithm 86 proceeds to 124 and sets the fuel maintenance mode flag to false.

If the fuel timer is greater than the specified time period at 122, the algorithm 86 proceeds to 126 and sets the fuel maintenance mode flag to true. The flag being set to true triggers entry into a fuel maintenance mode of operation for the vehicle, and causes fuel to be consumed, thereby using existing fuel in the tank and preventing or reducing fuel degradation based on the age of the fuel in the fuel tank.

At 128, the algorithm 86 checks to see if the vehicle is being shut down or keyed off by the user. If the vehicle is not being shut down at 128, the algorithm 86 returns to 98. If the vehicle is being shut down, the algorithm 86 stores the variables, such as the values for the fuel timer, the fuel_used, the fuel_to_be_used, the maintenance mode flags, and any other variables to non-volatile memory at 130, and the algorithm 86 then ends at 132.

Figure 5:
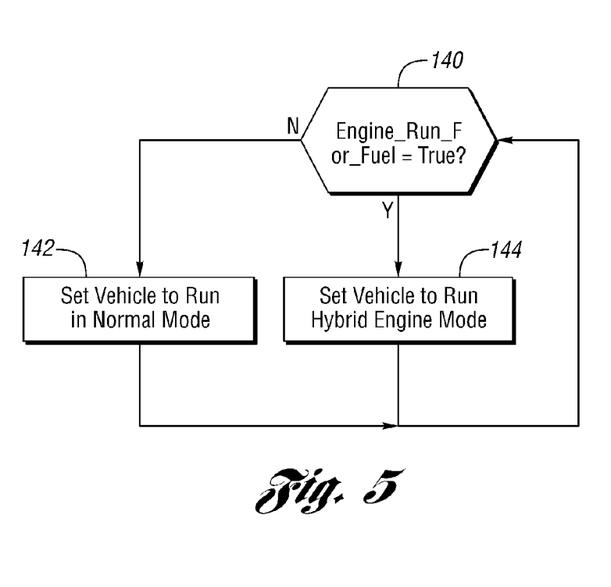
FIG. 5 is a flowchart illustrating implementation of the fuel maintenance monitor.

FIG. 5 is an embodiment of a flow chart for the VSC 68 to control vehicle operation based on the fuel maintenance mode flag from blocks 124 and 126. The controller 68 continually or periodically checks the fuel maintenance mode flag at 140 as set by the algorithm 86 at 124 and 126. If the flag is set to false, the VSC 68 operates the vehicle normally at 142, which can include operation in a charge sustaining mode, a charge depleting mode, a user selected mode, an EV mode, an HEV mode or another mode of operation as required by a vehicle state or to meet a vehicle requirement.

If the flag is set to true at 140, the VSC 68 causes the vehicle to enter a fuel maintenance mode at 144, which causes the vehicle to operate in a hybrid mode of operation. In one embodiment, the vehicle operates in a generally charge sustaining mode requiring selective engine operation to consume fuel from the fuel tank at 144.

Figure 6:
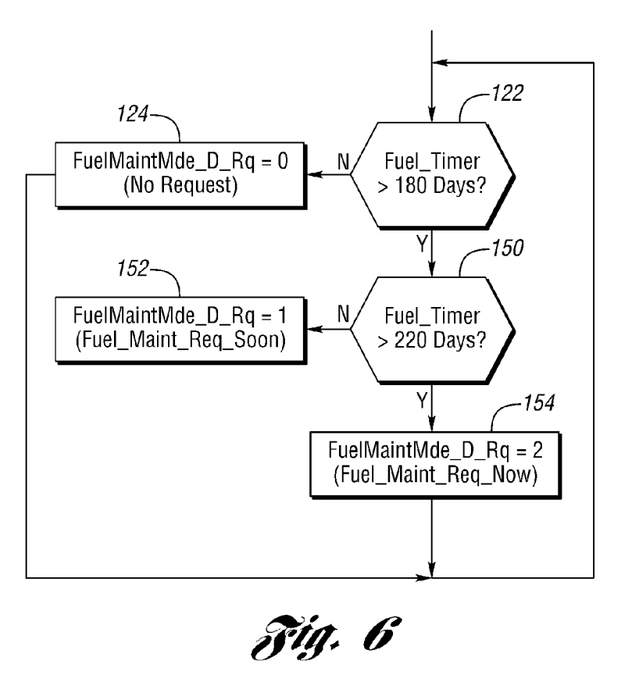
FIG. 6 is a flowchart illustrating alternative fuel maintenance monitor flags for use with the monitor of FIG. 4.

A further embodiment of the algorithm 86 is illustrated in FIG. 6, where the fuel timer may be compared to a second specified time value in an inquiry subsequent to 122 in algorithm 86 as disclosed in FIG. 4. The second specified time period may be one year, 220 days, or another time period longer than the time period (180 days) set in 122. If the fuel timer is less than the time period as set by 122, the flag is set to false or zero at 124, as in FIG. 4. The fuel timer is then compared to the first and second time periods at 150. If the fuel timer is between the first and second time periods, as determined at 150, i.e. between 180 days and 220 days, the fuel maintenance mode flag may be set to one, or another value, at 152 which will cause the VSC to command the user interface 70 to display a message which provides a user with information that the fuel maintenance mode is approaching in time. The message may be provided textually or graphically, for example using a gauge. In one embodiment, the user interface 70 includes a fuel gauge. In normal operation, the fuel gauge provides information regarding the amount of fuel in the tank. During a fuel maintenance mode, the gauge displays the amount of fuel in the tank, as well as the fraction that will be consumed in the fuel maintenance mode. In some embodiments, the flag being set to one may also trigger entry into the fuel maintenance mode, such that the vehicle is operated in a hybrid mode of operation.

If the fuel timer is longer than the second time period, i.e. more than 220 day, at 150, the fuel maintenance mode flag may be set to two, or another value, at 154 which will cause the controller 68 to command the user interface 70 to display a message stating that the fuel maintenance mode has been entered. The flag set to two may cause the VSC 68 to operate the vehicle in a hybrid mode of operation. In one embodiment, this may by a generally charge sustaining mode of operation. In another embodiment, this may be a modified hybrid mode of operation, where the engine is used more frequently to consume fuel at a faster rate. For example, the VSC 68 may prevent charging the traction battery using energy from regenerative braking or charging the traction battery using energy from the engine that exceeds vehicle demand.

In one embodiment, the hybrid mode of operation with the flag set to one is a charge sustaining mode where the battery state of charge is generally maintained by using the both the electric machine 60 and the engine 56. The engine 56 may be selectively used in this mode of operation, as there may be times where the engine 56 is shut down when the battery state of change is being generally maintained, i.e. when the vehicle is at rest, when the vehicle is going downhill, at other low or no power demands, and the like. The HEV mode may be delayed if the traction battery 66 is at full charge and the state of charge needs to be reduced to allow the vehicle to operate in a charge sustaining mode, such as when some charging of the battery could occur due to a long period of regenerative braking, and the like.

In another embodiment, the hybrid mode of operation with a fuel maintenance flag set to two is a modified hybrid mode of operation with some charging functions for the traction battery 66 disabled. This causes the traction battery 66 to discharge at a faster rate and require longer and/or more frequent periods of engine 56 operation while the vehicle is operating. For example, charging the traction battery using regenerative braking or using excess energy from the engine may be disabled in the modified hybrid mode.

In some embodiments, the vehicle has a user interface 70 that permits a user selection of EV operation for the vehicle, thereby causing the vehicle to operate using only the electric machine 60 and energy from the traction battery 66. The vehicle operates using only the electric machine 60 in a user selected EV mode until the user unselects this option or until a vehicle state requiring HEV operation occurs. The vehicle state requiring HEV operation may be a low state of charge for the traction battery or the vehicle having a high power demand that exceeds available power from the electric machine 60. When the vehicle is in a user selected EV mode, the VSC may delay a fuel maintenance mode request. This allows the vehicle operation to meet user expectations of operating in the user selected EV mode, while meeting the fuel maintenance mode request.

Figure 7:
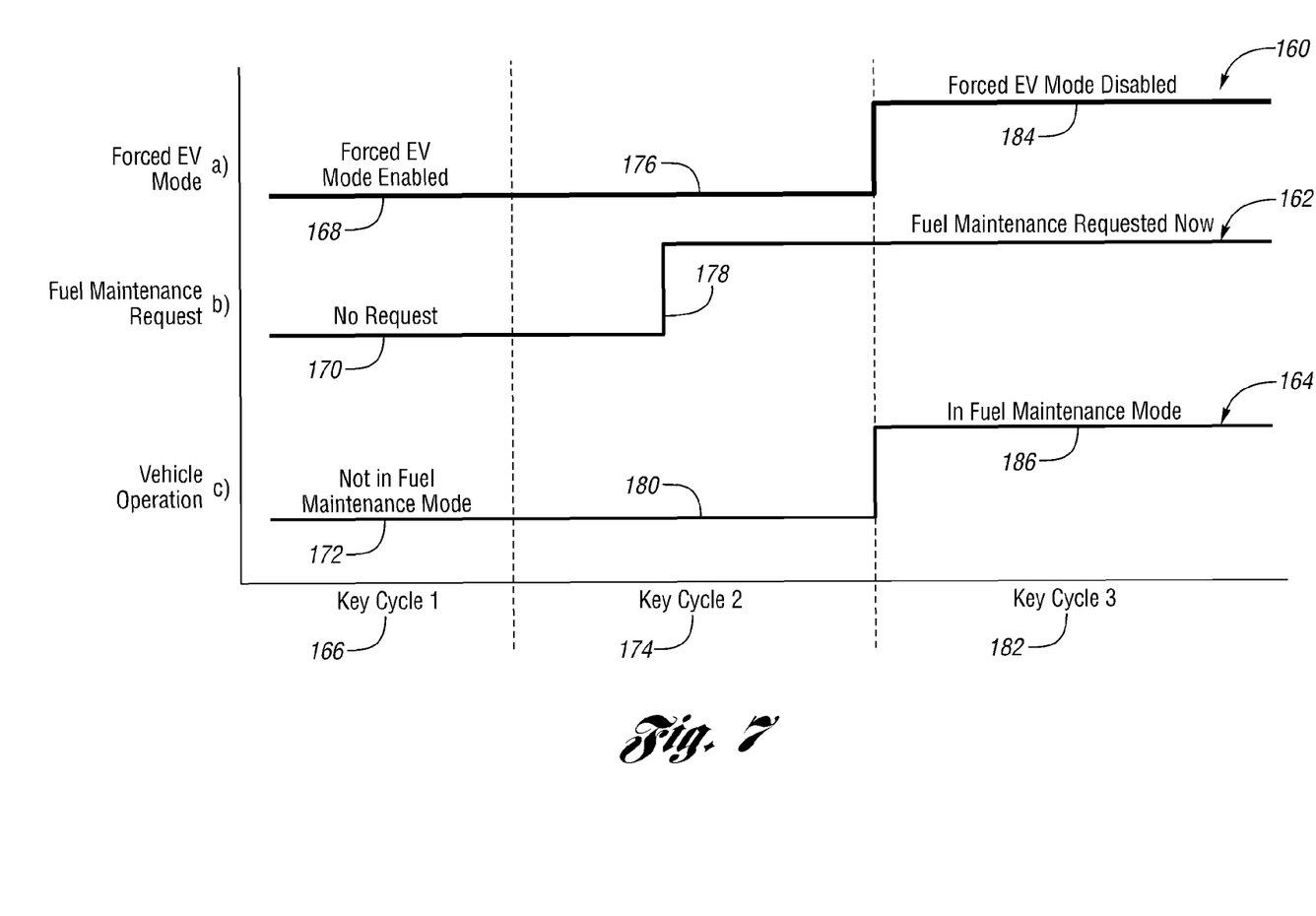
FIGS. 7*a*, 7*b*, and 7*c* are graphs illustrating vehicle modes of operation with the fuel maintenance monitor under various entry conditions.

FIG. 7 illustrates control of vehicle modes of operation based on beginning in a user selected EV mode and the fuel maintenance mode being requested. FIG. 7a illustrates the user selected EV mode operation at 160. FIG. 7b illustrates a request for fuel maintenance mode at 162. FIG. 7c illustrates the operation of the vehicle in a fuel maintenance mode at 164. In a first vehicle key cycle 166, the vehicle is operating in a user selected EV mode at 168, and no fuel maintenance request has been made at 170. Therefore, the vehicle is not operating in a fuel maintenance mode of operation, as shown by 172 during the first key cycle 160.

During a second key cycle 174, the vehicle continues to operate in a user selected EV mode 176. A request is then made for a fuel maintenance mode of operation at 178, such as a flag being set by algorithm 86. The vehicle continues to operate in EV mode at 176, and the vehicle does not operate in a fuel maintenance mode, as shown by 180, during the second key cycle 174. The operation of the vehicle in the fuel maintenance mode is delayed and not initiated in the middle of a key cycle with a user selected EV mode of operation to avoid disrupting the user selection.

In a third key cycle 182, the EV mode is disabled at 184, and the vehicle is operated in a fuel maintenance mode at 186, as caused by the fuel maintenance mode request 188 that occurred in the previous key cycle 174. In some embodiments, as long as the vehicle is operating in a fuel maintenance mode 186, the user selected EV mode is disabled such that the user cannot select electric-only operation using the human machine interface and further delay using fuel in the fuel tank.

The fuel maintenance mode as well as other information relating to the fuel maintenance mode may be displayed to the user via the HMI system 70. For example, a message may be displayed on the HMI 70 screen after the VSC 68 sets a request for a fuel maintenance mode of operation, or when the vehicle is operating in a fuel maintenance mode, thereby informing the user. The user may also be informed via an indicator light or other display interface. This may act as an alert for the user to provide a reason for engine operation when the vehicle could otherwise be operating on battery power alone.

In other embodiments, the user may also be informed of the current status of the fuel system, such as the time until the vehicle enters a fuel maintenance mode, the fuel_used, or the fuel_to_be_used by the vehicle. This may help to user better understand vehicle operation and also to make informed decisions regarding selection of EV mode, for example. The user may also receive a warning notice through the HMI system 70 that the vehicle will enter a fuel maintenance mode in the near future, such as in thirty days, seven days, or the like.

Referring back to FIG. 4, in another embodiment of the algorithm 86, a quality value is used in place of the fuel timer. The quality of the fuel is compared to a threshold to determine if the fuel maintenance monitor is flagged. The flag may be set by the quality being below a threshold. Fuel quality is generally the inverse of time or age of the fuel. The fuel quality can be increased by a refueling event or by using existing fuel in the fuel tank. Fuel quality is decreased with passing time. For example, quality may be calculated using:

$$Quality(t) = Quality(t-1)\left(\frac{Volume(t-1)}{Volume(t)}\right) + Quality_C\left(\frac{Volume(t) - Volume(t-1)}{Volume(t)}\right)$$

where t is the present time, and t−1 is some previous time. The Volume is the level of fuel in the fuel tank. The value for Quality, may be a constant value or a weighting factor, and in one embodiment is set to one. By adding fuel, quality will be increased, similar to incrementing the fuel timer. However, a certain amount of fuel may need to be added to raise the quality above the threshold triggering the fuel maintenance mode. New fuel may be considered to have a quality of 1, or 100%. The quality decreases towards zero as the fuel ages.

Various examples may be used to explain the fuel maintenance mode using either the fuel timer or the quality measure with algorithm 86. In a first example, a user drives the vehicle 50 beginning with some fuel in the fuel tank without using any fuel or using very little fuel, and six months elapses without a refueling event. At this point the VSC 68 enters the fuel maintenance mode and remains in the fuel maintenance mode. The VSC 68 may exit the fuel maintenance mode when a specified fraction of fuel is used by the engine, such as half of the fuel that was in the fuel tank initially. The VSC 68 may exit the fuel maintenance mode if the user continues to operate the vehicle 50 in fuel maintenance mode and does not refuel when the fuel tank reaches one gallon remaining. When the tank reaches one gallon remaining, the VSC 68 ends the fuel maintenance and the vehicle 50 is operated in electric only mode because insufficient fuel remains to operate in hybrid mode. Alternatively, the VSC 68 may exit the fuel maintenance mode by refueling the vehicle 50, such that the fuel timer is incremented or reset, or the quality is increased above its threshold.

As such, various embodiments according to the present disclosure provide associated non-limiting advantages. For example, the PHEV uses fuel in a timely manner before the fuel can degrade due to age. A fuel maintenance monitor causes the engine to operate to use fuel when it may not otherwise operate. A specified fraction of fuel is set to be used after expiration of a specified time period or when a quality value for the fuel is below a threshold value. The specified time period or the quality can be modified, for example, by a refueling event. The user is informed to maintain user expectations for the vehicle operation. The vehicle may be operated in one of several modes when the fuel maintenance monitor is triggered. For example, the vehicle may operate in a charge sustaining mode, or HEV mode, which provides for operation of the engine and/or the electric machine, and provides improved fuel economy over engine only operation of the vehicle. The vehicle may also be operated in a modified hybrid mode with charging features of the traction battery disabled, thereby causing increased engine use and fuel consumption.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
an engine;
a fuel tank configured to supply fuel to the engine;
an electric machine;
a traction battery electrically connected with the electric machine;
a controller configured to selectively operate the engine, during one or more drive cycles, until a specified fraction of fuel from the tank has been consumed in response to expiration of a predefined time period to limit degradation of the fuel; and
a user interface in communication with the controller and configured to provide user selection of electric-only operation of the vehicle;
wherein the controller is further configured to disable user selection of electric-only mode when selectively operating the engine, during the one or more drive cycles, until the specified fraction of fuel from the tank has been consumed.

2. The vehicle of claim 1 wherein the controller is further configured to operate the engine and the electric machine to generally maintain a state of charge of the battery, during the one or more drive cycles, until the specified fraction of fuel from the tank has been consumed.

3. The vehicle of claim 2 wherein the specified fraction is a first specified fraction and the predefined time period is a first predefined time period; and
wherein the controller is further configured to operate the engine and the electric machine to generally maintain a state of charge of the battery, during the one or more drive cycles, until a second specified fraction of fuel from the tank has been consumed in response to expiration of a second predefined time period.

4. The vehicle of claim 3 wherein the expiration of the second predefined time period occurs after the expiration of the first predefined time period.

5. The vehicle of claim 1 wherein the controller is further configured to operate the engine and the electric machine without charging the battery, during the one or more drive cycles, until the specified fraction of fuel from the tank has been consumed.

6. The vehicle of claim 1 wherein the controller is further configured to extend the predefined time period in response to addition of fuel to the fuel tank before expiration of the predefined time period.

7. The vehicle of claim 6 wherein the controller is further configured to extend the time period by a length of time related to an amount of fuel added to the tank.

8. The vehicle of claim 1 wherein the controller is further configured to reset the predefined time period in response to engine operation consuming a predetermined amount of fuel before expiration of the predefined time period.

9. The vehicle of claim 1 wherein the controller is further configured to end the selective operation of the engine and reset the predefined time period in response to the specified fraction of fuel from the tank being consumed.

10. The vehicle of claim 1 wherein the controller is further configured to selectively operate the engine beginning at a next drive cycle when the vehicle is operating in a user selected electric-only mode in response to expiration of the predefined time period.

11. The vehicle of claim 1 wherein the user interface is further configured to display the specified fraction of fuel to be consumed.

12. The vehicle of claim 1 wherein the user interface is further configured to display a message related to selective operation of the engine.

13. A method of controlling a hybrid vehicle comprising:
in response to a controller determining expiration of a predefined time period, selectively operating an engine via the controller, during one or more vehicle drive cycles, to generally maintain a traction battery state of charge until a specified fraction of fuel in a tank is consumed to limit fuel degradation; and
disabling user selection of electric-only vehicle operation via the controller after the period expires.

* * * * *